United States Patent Office 3,014,165
Patented Dec. 19, 1961

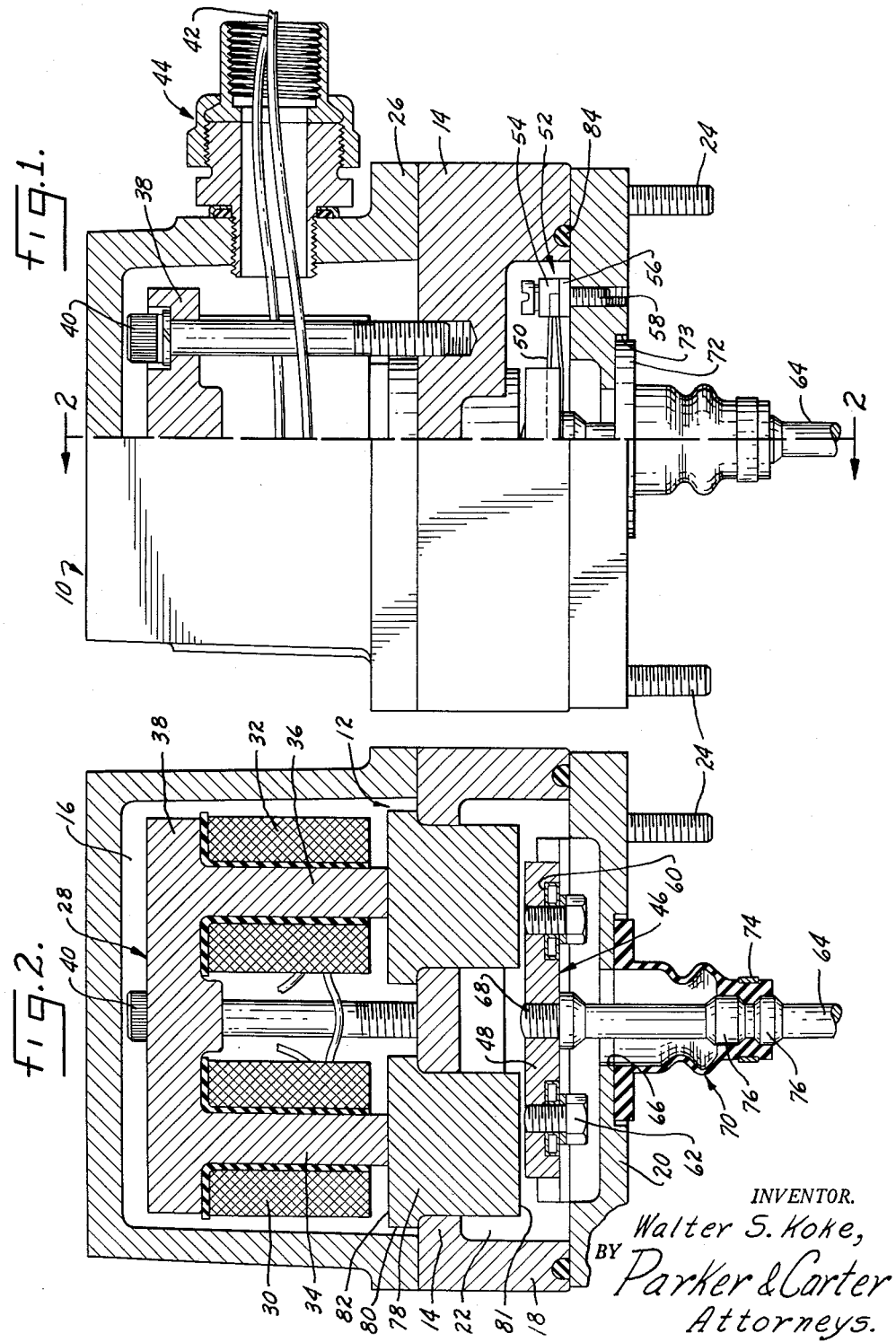

3,014,165
EXPLOSION-PROOF ELECTROMAGNET
Walter S. Koke, Homewood, Ill., assignor to Novo Industrial Corporation, a corporation of New York
Filed July 17, 1958, Ser. No. 749,239
4 Claims. (Cl. 317—165)

This invention is in the field of electromagnetic vibrating units or vibrators and more specifically is concerned with an explosion-proof electromagnet for what may be considered relatively high frequency vibrating installations.

A primary object of the invention is an explosion-proof electromagnet in which all electric connections are sealed.

Another object is a high frequency electromagnetic vibrator which has an isolated electric circuit with the magnetic field created thereby extending from the isolated or sealed electric circuit.

Another object is an explosion-proof electromagnet which is simple to manufacture and accordingly inexpensive.

Another object is a high frequency electromagnet having extension so that the magnetic field, at the point of use, is separate from the electrical circuit.

Another object is a housing for an electromagnet which is constructed to seal off the electric circuit with the magnetic circuit extending from the sealed chamber.

Other objects will appear from time to time in the ensuing specification and drawings in which:

FIGURE 1 is a side view, in half section, of the electromagnet; and

FIGURE 2 is a section along line 2—2 of FIGURE 1.

In the drawings the unit has been shown as including a housing 10 which is generally closed on all sides but open at one end, as at 12. The open end is closed by an intermediate plate 14 or the like which defines a closed chamber 16 with or in the housing. The intermediate plate 14 is provided with an outstanding flange 18 or the like and is closed by a suitable base plate 20 or the like to define what may be referred to as an open chamber 22. The three parts, the housing 10, the intermediate plate 14, and the base plate 20 are held together by suitable bolts 24 or the like which pass through a suitable flange 26 or the like on the housing, through suitable openings in the outstanding flange 18 of the intermediate plate and through the base plate. Suitable nuts or the like may be provided so that the various parts may be pulled together to form a tight sealing fit.

The closed housing or chamber 16 is provided with a suitable coil structure, designated generally 28, which may include two coils 30 and 32 having cores 34 and 36, respectively. A core plate 38 or the like may extend across the top of the coils and may be formed integrally with the cores 34 and 36. One or more suitable bolts 40, as shown in FIGURE 1, may be used to pull the entire coil structure down toward the intermediate plate 14. It will be noted in FIGURE 1 that the ends of the bolt 40 are threaded into the intermediate plate 14. Thus the coil structure is mounted, in effect, on the upper surface of the intermediate plate. When the bolts 24 are removed, the housing 10 may be lifted off and the coil structure will be fully exposed on top of the intermediate plate.

As shown in FIGURE 1 leads 42 may extend through a suitable explosion-proof connection 44 in one wall of the housing to the coils.

An armature 46 in FIGURE 2 may include an armature plate 48 suspended or held in the open chamber 22 by one or more suitable spring assemblies 50. As shown in FIGURE 1 each of the spring assemblies may include a plurality of leaf springs clamped at each end by a suitable clamping arrangement 52. The clamping arrangement may include upper and lower spring holders 54 and 56 pulled together by suitable screws 58 or the like which may extend into the base plate 20. A suitable gap or notch is provided in the holders so that the ends of the spring may be releasably clamped by the screws 58. As will be noted in FIGURE 2 the springs may pass through suitable notches 60 in the lower side of the armature plate and may be held therein by a suitable screw 62 or the like. A suitable stem or shaft 64 may extend through an opening 66 in the base plate with the upper end thereof, in FIGURE 2, being suitably connected to the armature plate at 68, for example by threading or otherwise. A boot 70 of neoprene or any suitable material may have an outstanding flange 72 at its upper end lying in an annular recess 73 or the like in the base plate. The lower end of the boot may be clamped, as at 74, between annular projections or flanges 76 suitably formed on the stem. It will be noted that the intermediate portion of the boot has a bellows configuration to accommodate axial movement of the stem or rod.

One or more inserts 78 are shown as extending through suitable openings in the intermediate plate 14. Each insert may have an outstanding flange 80 at or adjacent its upper end which lies in the closed chamber 16 and abuts the top surface of the intermediate plate 14. The lower end 81 of each insert may extend down into the open chamber 22 and, as shown in FIGURE 2, will lie in predetermined spaced relation to the armature plate 48 when the unit is at rest.

The upper surface of the insert, as at 82, is flush with and in rigid abutment with the lower end of the core of the coil. Where two coils are used, such as shown in FIGURE 2, two inserts may be disposed through the intermediate plate, one for each coil. In each case the core rigidly abuts the upper surface of the insert. In effect, the insert serves as a magnetic extension or conduit for the magnetic field that will be set up in the coil.

A suitable O ring seal of neoprene 84 or the like may be used to seal the intermediate plate to the base plate, and it should be noted in FIGURE 1 that the channel for the seal lies inboard of the passage for the connecting bolts 24.

The use, operation and function of the invention are as follows:

The electromagnet provides an explosion-proof set-up since the entire electrical circuit is sealed in the upper chamber. It will be noted that all of the coils and connections are above the intermediate plate. Additionally, the magnetic circuit is caused to extend into the lower chamber since the inserts will function as magnetic conductors or channels. In this regard the insert should be a suitable metal that has a high transmissibility to high frequency magnetic flux. At the same time, the intermediate plate 14, while it may be metallic, should be a non-magnetic material or a metal with high flux resistance.

The arrangement shown has the advantage that the mounting of the coils on the upper surface of the intermediate plate allows the coils to be pulled down so that the ends of the cores will be pulled tightly down against the inserts or extensions. In this respect the upper surface of each insert and the lower surface of the cores should be ground so that the two surfaces may be made as flush as possible, thereby reducing the resistance to flux flow to a minimum.

In this respect the core may be made with an integral extension that extends through the wall of the intermediate plate and a tight fit should be achieved between the intermediate plate and the core. In the form shown, it is preferred that the inserts be provided with a forced fit with the intermediate plate or a shrink fit. If the cores are made with integral extensions that run through the intermediate plate, the core plate 38 should be separate and may be screwed to the upper ends of the cores. Under certain circumstances it might be desirable to cast the intermediate plate 14 around the extensions, be they separate inserts, such as shown in FIGURE 2, or integral extensions of the cores as suggested hereinabove. In any case, it should be emphasized that there should be a tight fit between the extensions and the intermediate plate so that no flux or electrical leakage may take place.

The lower surfaces of the extensions or inserts are slightly spaced from the armature plate 48 and when an alternating magnetic field is set up by the coils, the armature will be alternately attracted and released. The spring assemblies are calibrated as to rate, strength, etc. in relation to the weight of the armature and the rod or stem 64 such that the natural period of vibration of the spring assemblies plus the weight of the attached mechanism will set up a resonant or harmonic condition when the armature is vibrated at a predetermined cyclical frequency by the coils.

Whereas the preferred form of the invention has been shown and several variations have been suggested, it should be understood that suitable additional modifications, changes, substitutions, alterations and variations may be made without departing from the invention's fundamental theme. It is, therefore, wished that the invention be unrestricted except as by the appended claims.

I claim:

1. In an explosionproof vibrating electromagnet, a housing defining a first chamber and having an otherwise open lower end, a non-magnetic intermediate wall of a high flux reluctance material closing the otherwise open lower end of the housing and defining a second chamber facing away from the housing, at least one magnetic coil and core in a first chamber, sealed connections leading into the first chamber to the coil, a spring mounted armature in the second chamber constructed to vibrate therein, a core extension for the core extending through the non-magnetic intermediate wall and extending into the second chamber, the core extension terminating opposite the armature, a vibrating rod extending from the second chamber in a direction away from the coil and core through an opening and connected to the armature so as to vibrate therewith, and a flexible seal around the opening in the second chamber connected to the rod to seal the opening but allowing the rod to vibrate freely.

2. The structure of claim 1 further characterized by and including a plurality of leaf spring assemblies suspending the armature and rod in the second chamber in predetermined spaced relation to the core extension, when at rest.

3. The structure of claim 1 further characterized in that the core extension is separate from and in abutting relation with the core.

4. The structure of claim 3 further characterized in that the separate core extension is press fitted in an opening in the intermediate wall.

References Cited in the file of this patent

UNITED STATES PATENTS

| 1,303,973 | Sengebusch | May 20, 1919 |
| 1,846,326 | Flint | Feb. 23, 1932 |
| 2,911,183 | Matthews et al. | Nov. 3, 1959 |

FOREIGN PATENTS

| 542,088 | France | May 11, 1922 |